(12) United States Patent
Burford

(10) Patent No.: US 9,764,821 B2
(45) Date of Patent: Sep. 19, 2017

(54) PROPELLER ASSEMBLY AND PROPELLER BLADE RETENTION ASSEMBLY

(71) Applicant: GE Aviation Systems Limited, Cheltenham (GB)

(72) Inventor: Daryl John Burford, Coleford (GB)

(73) Assignee: GE AVIATION SYSTEMS LIMITED (GB)

( * ) Notice: Subject to any disclaimer, the term of this patent is extended or adjusted under 35 U.S.C. 154(b) by 431 days.

(21) Appl. No.: 14/265,659

(22) Filed: Apr. 30, 2014

(65) Prior Publication Data

US 2015/0086374 A1    Mar. 26, 2015

(30) Foreign Application Priority Data

Sep. 26, 2013 (GB) .................................. 1317107.9

(51) Int. Cl.
*B64C 11/06* (2006.01)
*B64C 11/08* (2006.01)

(52) U.S. Cl.
CPC .............. *B64C 11/06* (2013.01); *B64C 11/08* (2013.01)

(58) Field of Classification Search
CPC ......... B64C 11/06; B64C 11/08; B64C 11/04; B64C 11/065; B64C 11/10; B64C 11/12
USPC .......................................... 416/204 R–204 A
See application file for complete search history.

(56) References Cited

U.S. PATENT DOCUMENTS

| | | | | |
|---|---|---|---|---|
| 3,043,563 A | * | 7/1962 | Gray .................... | F01D 5/3053 411/348 |
| 3,209,993 A | * | 10/1965 | Seifert .................... | F01P 7/087 192/105 B |
| 3,759,633 A | * | 9/1973 | Tournere ................. | F01D 5/326 403/381 |
| 4,033,705 A | * | 7/1977 | Luebering ............... | F01D 5/326 416/220 R |
| 4,349,318 A | * | 9/1982 | Libertini ................. | F01D 5/326 416/220 R |
| 4,396,352 A | * | 8/1983 | Pearce .................... | F04D 29/36 416/206 |
| 5,152,606 A | * | 10/1992 | Borraccia ............... | B01F 7/001 366/270 |
| 5,163,817 A | * | 11/1992 | Violette .................. | B64C 11/06 416/204 A |

(Continued)

FOREIGN PATENT DOCUMENTS

EP    0322344 A2    6/1989
GB    443750 A      3/1936

(Continued)

OTHER PUBLICATIONS

A Canadian Office Action issued in connection with corresponding CA Application No. 2863340 on Oct. 28, 2015.

(Continued)

*Primary Examiner* — William McCalister
(74) *Attorney, Agent, or Firm* — GE Global Patent Operation; William S. Munnerlyn (57) ABSTRACT

A propeller assembly having a hub having at least one receiver opening, a receiver located within the receiver opening and having a first collar defining a blade opening, a blade having a second collar and a protrusion with the second collar abutting the first collar and the protrusion received within the blade opening, and a first retainer, and a second retainer.

10 Claims, 6 Drawing Sheets

(56) References Cited

U.S. PATENT DOCUMENTS

| | | | |
|---|---|---|---|
| 5,415,527 A * | 5/1995 | Godwin | B64C 11/06 |
| | | | 416/205 |
| 6,015,264 A | 1/2000 | Violette et al. | |
| 2008/0304973 A1 | 12/2008 | Talasco et al. | |
| 2011/0058947 A1* | 3/2011 | Haynes | F04D 25/088 |
| | | | 416/210 R |
| 2012/0034085 A1* | 2/2012 | Lagman | F04D 25/088 |
| | | | 416/210 R |
| 2013/0094943 A1 | 4/2013 | Bouru et al. | |

FOREIGN PATENT DOCUMENTS

| | | | |
|---|---|---|---|
| GB | 486614 A | 6/1938 |
| GB | 2208125 A | 3/1989 |
| GB | 2244526 A | 12/1991 |
| GB | 2251896 A | 7/1992 |
| GB | 2372297 A | 8/2002 |
| JP | 38021751 Y | 10/1963 |
| JP | 49032389 A | 3/1974 |
| JP | 2013523526 A | 6/2013 |

OTHER PUBLICATIONS

GB Combined Search and Examination Report issued May 22, 2014 in connection with corresponding GB Patent Application No. GB1317107.9.

Hua et al., "Nonlinear Finite Element Analysis and Structure Size Optimization of Composite Shaft-hub Connection Structure Contact Problem of Propeller", Mechanical Drive, 3rd Edition, vol. No. 36, Issue No. 03, pp. 74-77, Jun. 30, 2012.

Unofficial English Translation of Chinese Office Action issued in connection with corresponding CN Application No. 201410505246.4 on Jan. 26, 2016.

Unofficial English Translation of Japanese Office Action issued in connection with corresponding JP Application No. 2014190616 on Jul. 28, 2015.

* cited by examiner

PROPELLER ASSEMBLY AND PROPELLER BLADE RETENTION ASSEMBLY

CROSS-REFERENCE TO RELATED APPLICATIONS

This application claims priority under 35 U.S.C. §119 to British Patent Application No. 13171079, filed Sep. 26, 2013, the disclosure of which is incorporated herein by reference.

BACKGROUND OF THE INVENTION

Contemporary air and surface sea-craft propeller assemblies may feature line-removable blades. Line-removable blades may be attached outboard of the hub by various means, such as bolts or clamps.

BRIEF DESCRIPTION OF THE INVENTION

In one aspect, an embodiment of the invention relates to a propeller assembly having a hub having at least one receiver opening, a receiver located within the receiver opening and having a first collar defining a blade opening, a blade having a second collar and a protrusion with the second collar abutting the first collar and the protrusion received within the blade opening, a first retainer comprising aligned openings in the first and second collars and a bolt passing through the aligned openings, and a second retainer comprising a detent including a catch formed in one of the protrusion and receiver and a moveable strike formed in the other of the protrusion and receiver, wherein to assemble the blade to the receiver, the protrusion is inserted into the blade opening until the second collar abuts the first collar, the bolt is passed through the aligned openings, and the strike is moved into the catch.

In another aspect, an embodiment of the invention relates to a propeller blade retention assembly for use with a propeller assembly having a hub, receiver, and propeller blade, the propeller blade retention assembly having a first retainer for operably coupling the propeller blade to the hub and a second retainer for operably coupling the propeller blade to the receiver wherein the second retainer operably couples the propeller blade to the receiver upon failure of the first retainer and the second retainer, receiver, and propeller blade are configured to allow movement of the propeller blade upon failure of the first retainer.

DESCRIPTION OF EMBODIMENTS OF THE INVENTION

Figure 1:
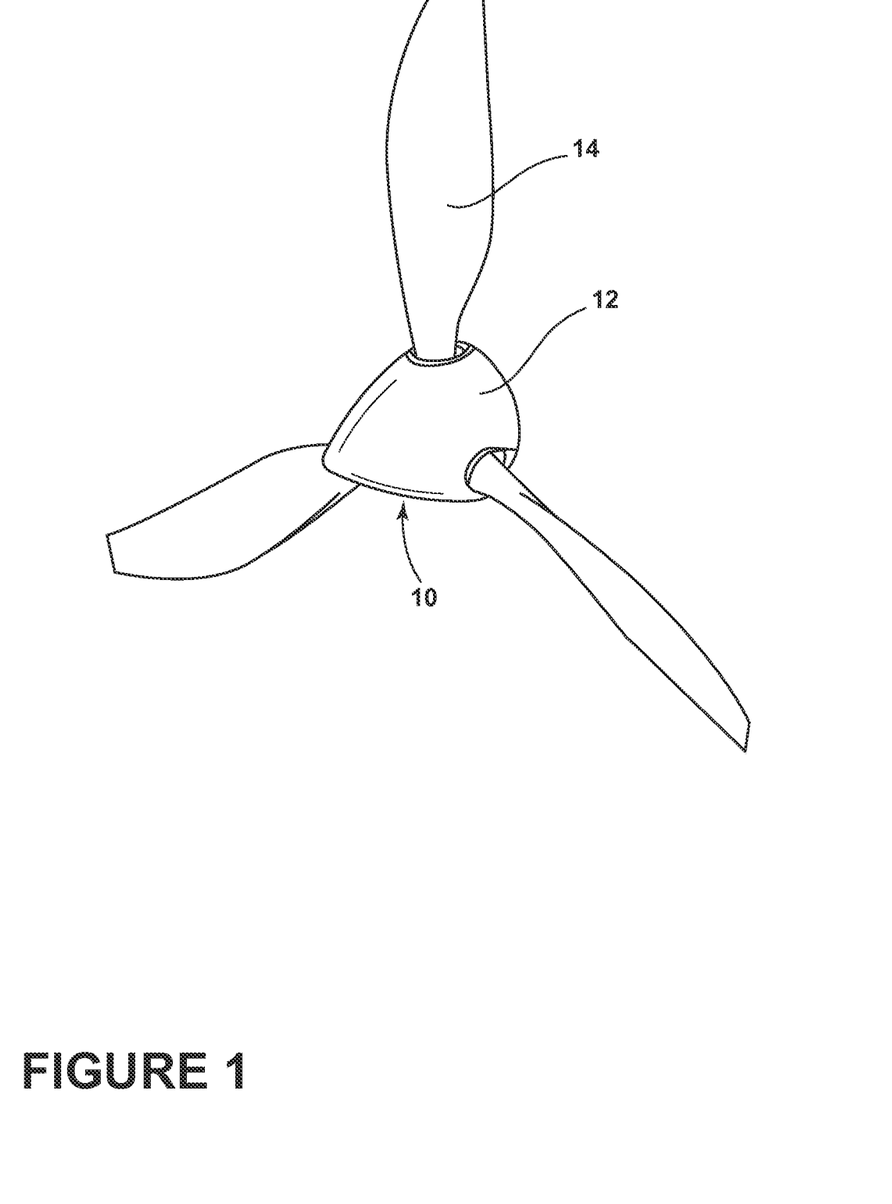
FIG. 1 is a schematic view of a propeller assembly including a hub and a blade.
Figure 2:
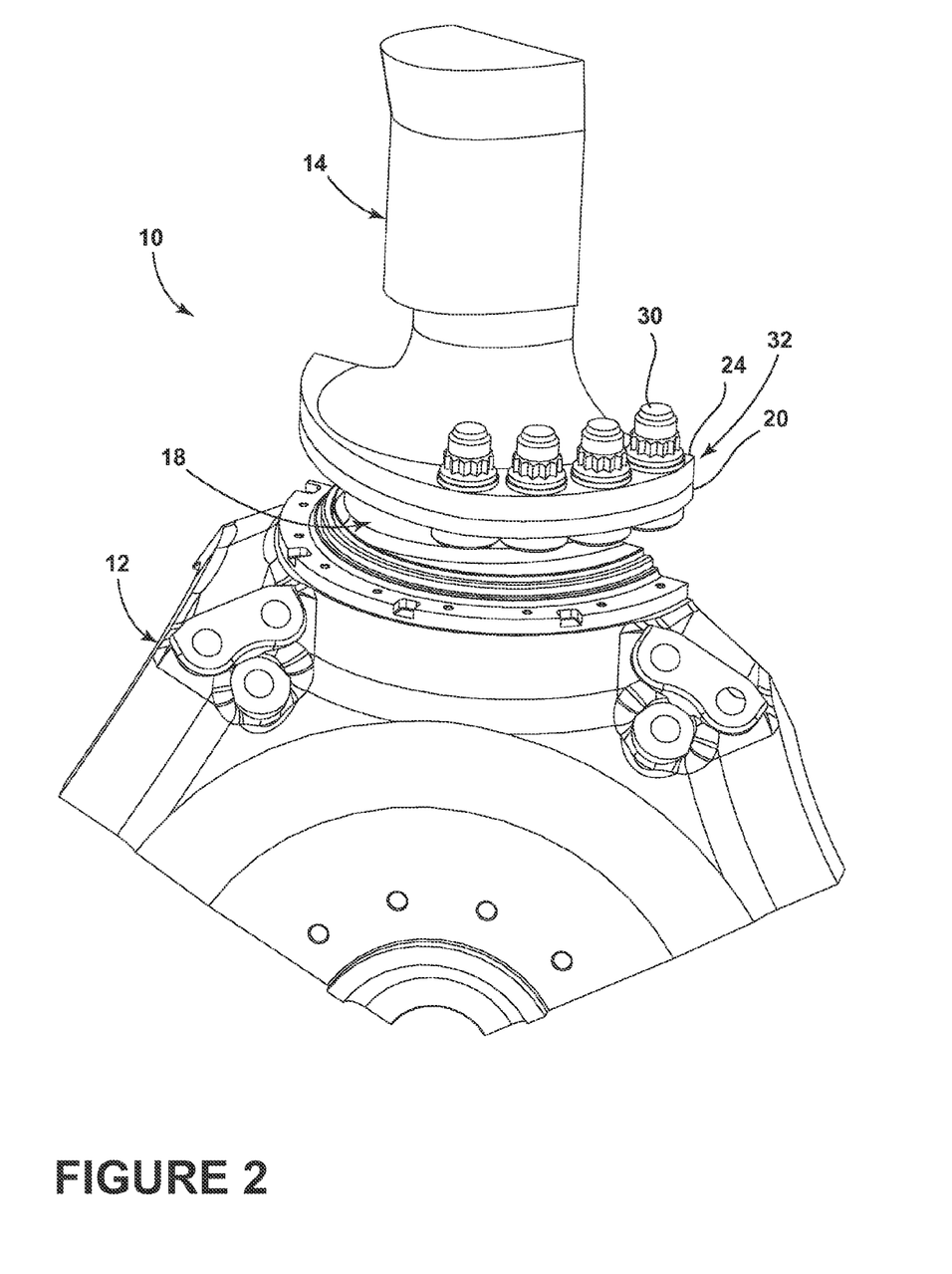
FIG. 2 is a perspective view of a portion of a propeller assembly.

FIG. 1 illustrates a propeller assembly 10 including a hub 12 and several blades 14. FIG. 2 illustrates one example of a portion of the propeller assembly 10 including the hub 12 and a blade 14. The hub 12 has a generally cylindrical shape that rotates about the propeller axis and provides a means to secure multiple blades 14. The hub 12 may be formed from any suitable material including metal or composite materials. The hub 12 may be formed in any suitable manner and may secure any number of blades 14. Typically a propeller blade 14 is formed in a twisted airfoil shape and may be composed of any suitable material, such as metal or composite materials. The blade 14 converts rotary motion into a propulsive force. The blade 14 may be line-removable to provide cost and maintenance advantages. Line-removable blades may be externally mounted outboard of the hub 12 and must be restrained adequately during their rotation. The term line-removable indicates that the blade 14 may be removed and replaced in the field.

Figure 3:
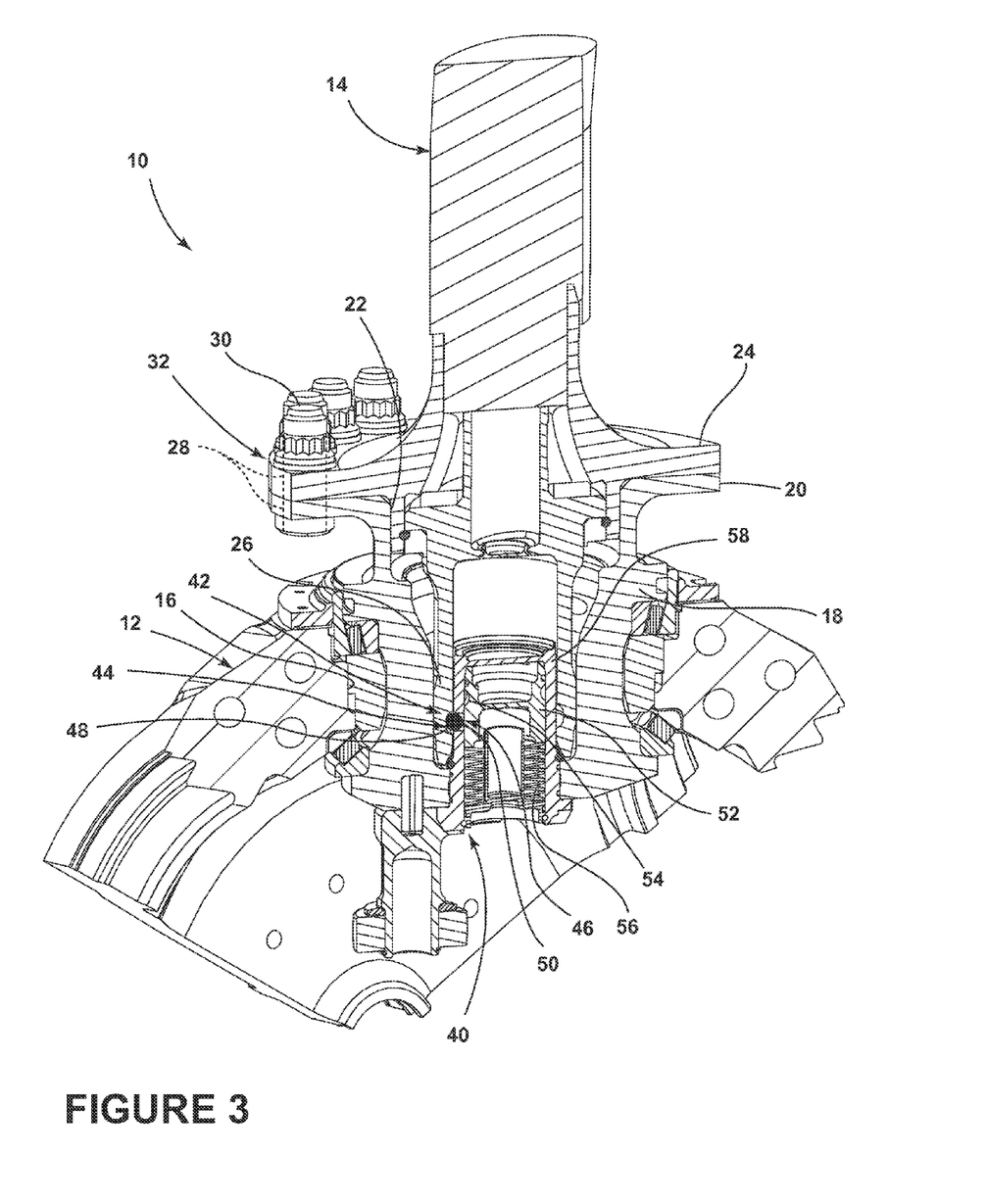
FIG. 3 is a cut-away view of the propeller assembly hub and blade from FIG. 1.

FIG. 3 illustrates the hub 12 and blade 14 with a cut-away view allowing inspection of a receiver opening 16 of the hub 12. The hub 12 may include one or more receiver openings 16. A receiver 18 may be located within the receiver opening 16 and may have a first collar 20 defining a blade opening 22.

The blade opening 22 of the receiver 18 may provide a receptacle for the blade 14 to be inserted. More specifically, the blade 14 has also been further illustrated as having a second collar 24 and a protrusion 26 and the protrusion 26 may be received within the blade opening 22. When this occurs, the second collar 24 of the blade 14 may abut the first collar 20 of the receiver 18. The first collar 20 and the second collar 24 may both include aligned openings 28 through which a bolt 30 may be provided to fasten the first collar 20 and the second collar 24. Multiple aligned openings 28 and corresponding bolts 30 may be used to fasten the first collar 20 and the second collar 24. A first retainer 32 may be formed by the aligned openings 28 in the first and second collars 20 and 24 and the bolt 30 passing there through. The first retainer 32 may act as a primary retention system to operably couple the blade 14 to the hub 12.

Further, a second retainer 40 may be included in the propeller assembly 10 and has been illustrated as including a detent 42 having a catch 44 formed in one of the protrusion 26 and receiver 18 and a moveable strike 46 formed in the other of the protrusion 26 and receiver 18. In the illustrated example, the catch 44 has been illustrated as a groove 48 in the protrusion 26 of the blade 14 and the moveable strike 46 has been formed in the receiver 18. Regardless of where the catch 44 and moveable strike 46 are located, the moveable strike 46 may move into the catch 44 to further retain the blade 14 to the hub 12. In the illustrated example, the moveable strike 46 has been illustrated as a selectively retractable ball 50 that may be retained in the groove 48 during operation. However, this need not be the case and it will be understood that any suitable catch and moveable strike may be used including, for example, that the moveable strike may include a segment type lock, a wire type lock, etc. The protrusion 26 and moveable strike 46 may be sized to allow radial movement of the protrusion 26 within the blade opening 22.

A lock 52, which may be moveable between a locked position and an unlocked position, may also be included in the second retainer 40. The lock 52 has been illustrated as including a piston having an undercut 54 such that when the lock 52 is in the unlocked position the moveable strike 46 and the ball 50 may be received within the undercut 54. A biasing element 56, which may maintain the lock 52 in the locked position during operation of the blade 14, may also be included in the second retainer 40. The biasing element 56 may be any suitable device and has been illustrated for exemplary purposes as a spring. Alternatively, other biasing devices or methods such as hydraulics and pneumatics may be used to maintain the lock 52 in the locked position during operation. A housing portion 58 may also be included in the second retainer 40 and may house the lock 52 and the biasing element 56.

Figure 4:
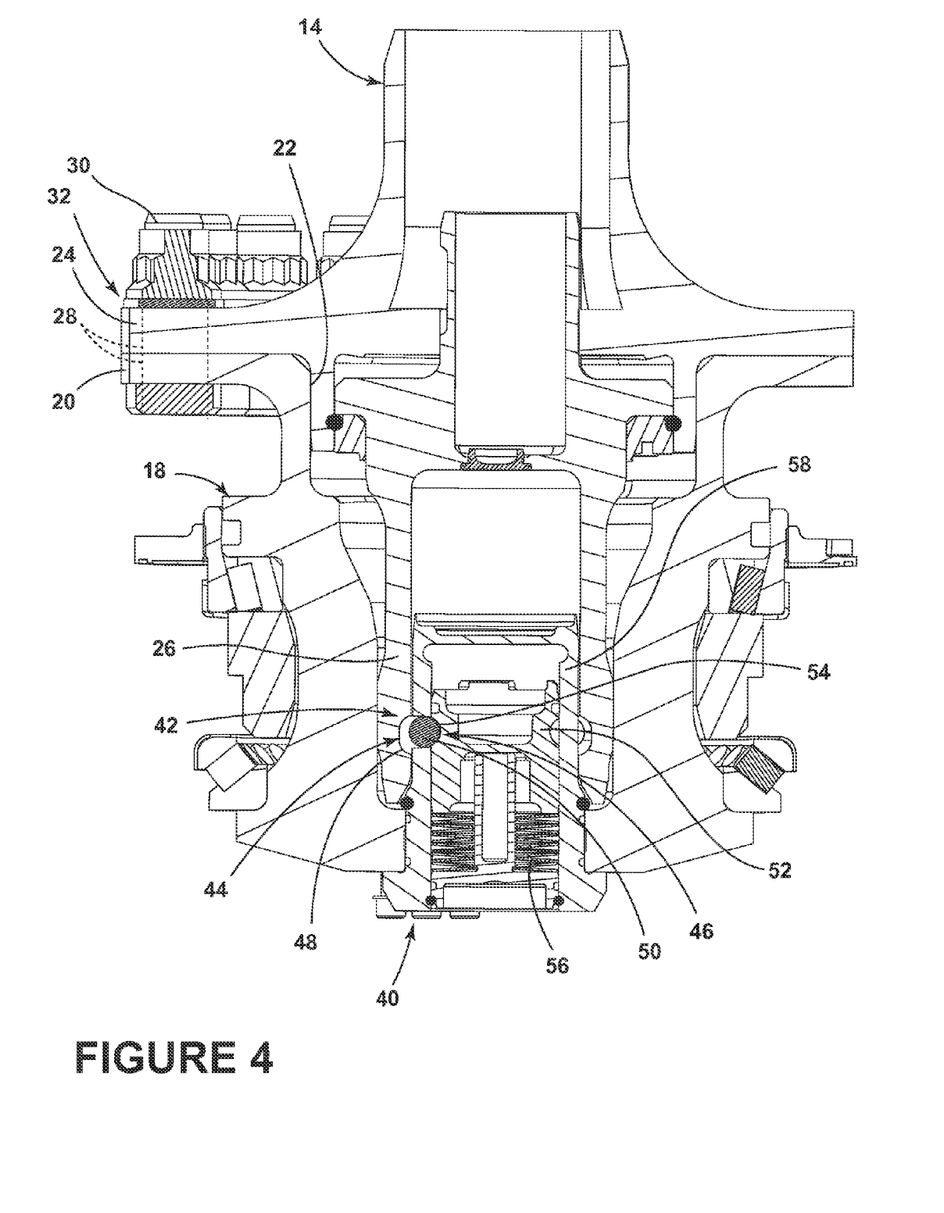
FIG. 4 is a cross-sectional view of a receiver and a blade showing the second retainer in an unlocked position.

FIG. 4 illustrates the second retainer 40 in the unlocked position wherein the blade 14 is separable from the hub 12 without disturbing the operability of the second retainer 40 and maintains the line-replaceable blade capability. Hydraulic pressure may be introduced through the housing portion 58 and may move the lock 52 and biasing element 56. More specifically, as hydraulic pressure fills the housing portion 58, the force of the biasing element 56 is overcome and the lock 52 is pushed towards the unlocked position. When the biasing element 56 and the lock 52 are moved to the unlocked position, as illustrated, the moveable strike 46 may be moved such that it is received within the undercut 54 of the lock 52. In this manner, the moveable strike 46 is not retained in the groove 48 and the blade 14 is not retained by the second retainer 40. Then, once the first retainer 32 is disengaged, the blade 14 may be removed from the receiver 18 via the blade opening 22. This may also be considered to be a maintenance position for the second retainer 40.

Figure 5:
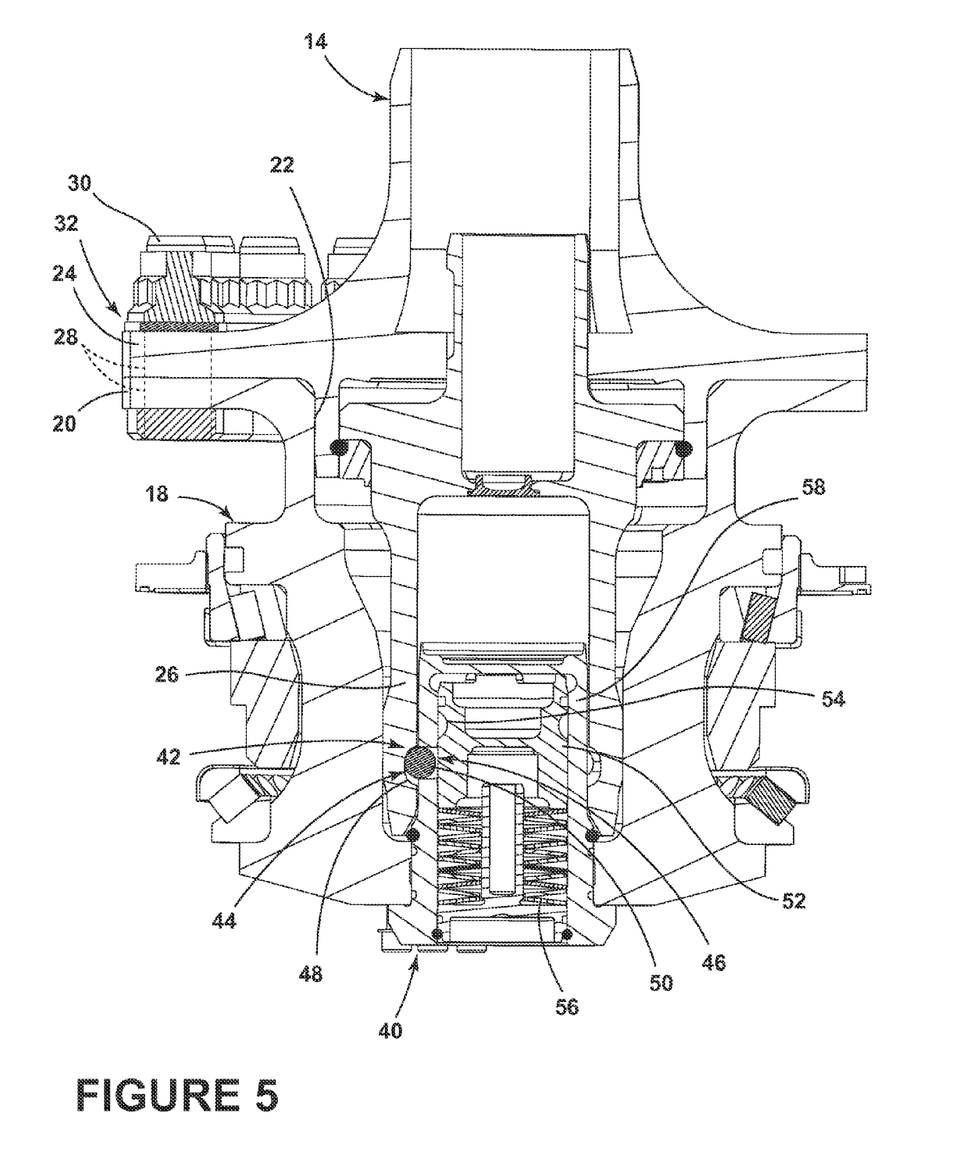
FIG. 5 is a cross-sectional view of a receiver and a blade showing the second retainer in a locked position.

FIG. 5 illustrates the lock 52 in the locked position wherein the blade 14 is operably coupled to the hub 12 via the first retainer 32 and the second retainer 40. When the lock 52 is in the locked position, the moveable strike 46 may no longer be housed within the undercut 54 and the moveable strike 46 is instead retained by the catch 44. This may also be considered to be the use position for the second retainer 40.

To assemble the blade 14 to the receiver 18, the piston 52 must be energized so that the piston 52 moves to the unlocked position and the ball 50 may be retracted and allow passage of protrusion 26 into the blade opening 22. The protrusion 26 may then be inserted into the blade opening 22 until the second collar 24 abuts the first collar 20. Bolts 30 may then be passed through the aligned openings 16 to operably couple the blade 14 to the hub 12. The piston 52 may then be de-energized and the moveable strike 46 may then be moved into the catch 44 to further operably couple the blade 14 to the hub 12.

Figure 6:
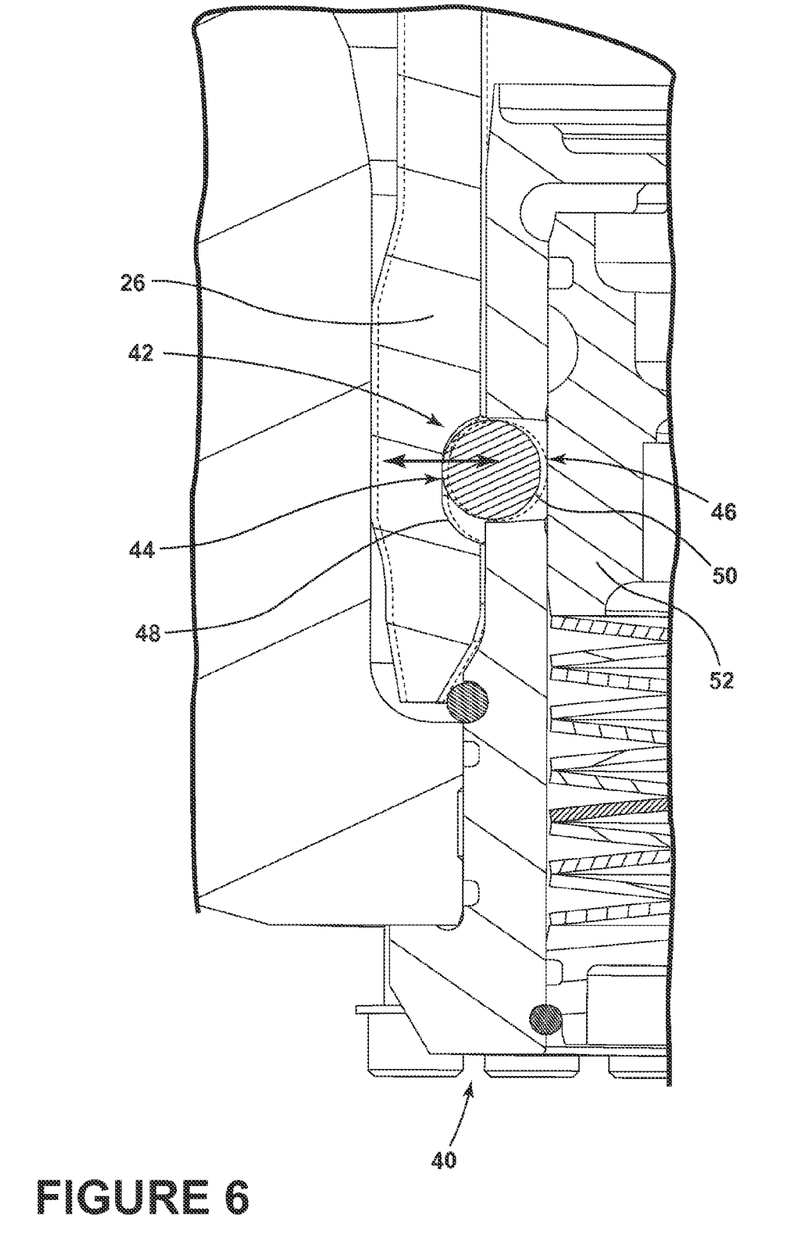
FIG. 6 is a cross-sectional view illustrating a portion of the blade moving radially while the second retainer in a locked position.

In this manner, the second retainer 40 may provide a secondary retention system to operably couple the blade 14 to the hub 12. The second retainer 40 upon failure of the first retainer 32 may still ensure that the blades 14 are adequately restrained during their rotation. The second retainer 40 may provide an alternate loadpath for retaining the blade 14. Optionally, in the event of a primary retention system failure, the sizing of the protrusion 26 and moveable strike 46 may allow for radial movement of the protrusion 26 causing an out of balance condition. For example, FIG. 6 illustrates that the protrusion 26 and detent 42 may be sized such that the protrusion 26 may move radially while the second retainer 40 is in the locked position. This may create an out of balance condition and provide vibration feedback to an operator of the aircraft. The noticeable vibration may alert crew to the primary retention failure and allow appropriate action such as shutting down the engine or landing of the aircraft.

The embodiments described above provide for a variety of benefits including that the second retainer operably couples the propeller blade to the receiver upon failure of the first retainer and the second retainer, receiver, and propeller blade are configured to allow movement of the propeller blade upon failure of the first retainer, which may create vibrations detectable by the aircraft crew. This may allow the line replaceable blade to be certifiable. Further, the above described embodiments allow the blade to continue to be line replaceable and do not require any specialized tooling to replace the blade. Further, the blade replacement does not affect the functionality of the hub or receiver. Furthermore, contemporary designs rely on bearing preloading being carried out in the field, which necessitates the use of cumbersome tooling that has to be available at multiple locations around the world and very specific tightening procedures that are difficult to accurately control.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A propeller assembly for an aircraft comprising:
   a hub having at least one receiver opening;
   a receiver located within the receiver opening and having a first collar defining a blade opening;
   a blade having a second collar and a protrusion, with the second collar abutting the first collar and the protrusion received within the blade opening;
   a first retainer comprising aligned openings in the first and second collars and a bolt passing through the aligned openings; and
   a second retainer comprising a catch formed in the protrusion, and a moveable strike formed in a housing portion of the second retainer;
   wherein to assemble the blade to the receiver, the protrusion is inserted into the blade opening until the second collar abuts the first collar, the bolt is passed through the aligned openings, and the strike is moved into the catch.

2. The propeller assembly of claim 1 wherein the catch comprises a groove in the protrusion of the blade.

3. The propeller assembly of claim 2 wherein the moveable strike comprises a selectively retractable ball that is retained in the groove during operation.

4. The propeller assembly of claim 3 wherein the second retainer further comprises a piston moveable between a locked position and an unlocked position.

5. The propeller assembly of claim 4 wherein when the piston is in the unlocked position the ball is received within an undercut in the piston such that the ball is not retained in the groove and the blade is not retained by the second retainer.

6. The propeller assembly of claim 4 wherein the second retainer further comprises a biasing element to maintain the piston in the locked position during operation of the blade.

7. The propeller assembly of claim 6 wherein the piston and the biasing element may be moved to the unlocked position with hydraulic pressure introduced through a housing portion of the second retainer.

8. The propeller assembly of claim 1 wherein the protrusion and the strike are sized to allow radial movement of the protrusion within the blade opening during an out of balance condition.

9. The propeller assembly of claim 1 wherein the strike comprises a locking ball, a segment type lock, or a wire type lock.

10. The propeller assembly of claim 1 wherein the blade is separable from the hub without disturbing the operability of the second retainer.

\* \* \* \* \*